United States Patent
Chang et al.

(10) Patent No.: US 6,963,468 B2
(45) Date of Patent: Nov. 8, 2005

(54) PORTABLE STORAGE DEVICE

(75) Inventors: Chin-Lung Chang, Taipei Hsien (TW); Hui-Ming Chu, Taipei Hsien (TW); Tao-Min Chen, Taipei Hsien (TW)

(73) Assignee: Wistron Corp., Taipei Hsien (TW)

( * ) Notice: Subject to any disclaimer, the term of this patent is extended or adjusted under 35 U.S.C. 154(b) by 191 days.

(21) Appl. No.: 10/270,136

(22) Filed: Oct. 15, 2002

(65) Prior Publication Data

US 2004/0017636 A1 Jan. 29, 2004

(30) Foreign Application Priority Data

Jul. 26, 2002 (TW) .................... 91211539 U

(51) Int. Cl.⁷ .......................... G11B 5/012
(52) U.S. Cl. .................... 360/97.01
(58) Field of Search ............ 360/97.01; 345/156; 361/56; 235/492; 439/131, 638; 710/62

(56) References Cited

U.S. PATENT DOCUMENTS

| | | | | |
|---|---|---|---|---|
| 2002/0177362 A1 | * | 11/2002 | Chang | 439/638 |
| 2003/0043111 A1 | * | 3/2003 | Huang | 345/156 |
| 2003/0183698 A1 | * | 10/2003 | Wu | 235/492 |
| 2004/0003150 A1 | * | 1/2004 | Deguchi | 710/62 |
| 2004/0017636 A1 | * | 1/2004 | Chang et al. | 360/97.01 |
| 2004/0017637 A1 | * | 1/2004 | Chang et al. | 360/97.01 |
| 2004/0063346 A1 | * | 4/2004 | Lin et al. | 439/131 |
| 2004/0083320 A1 | * | 4/2004 | Yu | 710/62 |
| 2004/0125522 A1 | * | 7/2004 | Chiu et al. | 361/56 |

* cited by examiner

*Primary Examiner*—Tianjie Chen
(74) *Attorney, Agent, or Firm*—Michael Bednarek; Pillsbury Winthrop Shaw Pittman LLP

(57) ABSTRACT

A portable storage device comprises a housing having a first opening, a first directing portion and a second opening, and a main body having a storage portion, a connecting portion corresponding to the first opening, a second directing portion corresponding to the first directing portion, and a hanging portion corresponding to the second opening. The main body is slidably located inside the housing and is slidable between a first position and a second position. When the main body is situated at the first position, the connecting portion is exposed outside the first opening, and the hanging portion is hidden in the housing. The storage device is at a status of being used. When the main body is situated at the second position, the connecting portion is hidden in the housing, and the hanging portion is exposed outside the second opening. The storage device is at a status of being housed.

10 Claims, 3 Drawing Sheets

PORTABLE STORAGE DEVICE

BACKGROUND OF THE INVENTION

1. Field of the Invention

The present invention relates to a portable storage device, and particularly to a USB portable disk drive (Handy Drive) without a separated covering.

2. Description of the Prior Art

As computer technology advances, there is a trend to develop smaller and portable storage devices. Now, various portable storage devices, such as a portable disk drive, are common in the market, and most of them are connected to computers via universal serial bus (USB) interfaces.

FIG. 1 is a perspective diagram of a conventional USB portable disk drive 500. The drive 500 comprises a main body 510 having a storage portion, such as a flash memory, and a covering 520 separated form the main body for covering a USB terminal 515. In addition, the main body 510 further comprises an indicator light 530, such as a light-emitting diode (LED), for showing the operating status of the portable disk drive 500. Before using the USB portable disk drive 500, the user has to remove the covering 520 and plug the USB terminal 515 into a USB socket of the computer. When data is accessed and transmitted between the drive 500 and computer, the indicator light 530 will be turned on so as to emit light and show the USB portable disk drive 500 is at a status of being used. When finishing the use of the drive 500, the user can cover the USB terminal 515 with the covering 520 so as to protect the USB terminal 515 and keep it from dust. In addition, a hanging portion (not shown), such as a hooking ring or a hanging hole, can be installed on the main body 510 or the covering 520 so that the user can hang the drive 500 on the neck and carry it with him or her.

However, the conventional USB portable disk drive 500 has the following drawbacks when it is being used and carried.

First, the conventional USB portable disk drive 500 has a separated covering 520 for covering the USB terminal 515. When the user removes the covering 520 and uses the USB portable disk drive 500, he or she usually lays the covering 520 aside. Therefore, the user tends to lose the covering 520 for the carelessness especially when the USB portable disk drive 500 is repeatedly plugged into the computer for data accessing and taken out from the computer. Losing the covering 520 not only makes it impossible to keep the USB terminal 515 from the dust, but also damages the integrity of the external shape of the USB portable disk drive 500.

Furthermore, the indicator light 530 of the conventional USB portable disk drive 500 is a small LED, and therefore, no matter which position the LED is situated at, the light of the indicator light 530 cannot be easily identified from various angles. Particularly, when the computer system has various peripheral devices, the light emitted by the indicator light 530 will be affected by the surroundings or the other peripheral devices and cannot be easily identified. Consequently, the user tends to misjudge that the data accessing of the USB portable disk drive 500 is finished and then takes out the drive 500 when the drive 500 is still performing the data accessing so that the data accessing will be abnormally interrupted and the data may be damaged.

SUMMARY OF THE INVENTION

Therefore, the objective of the present invention is to provide a portable storage device comprising a main body and a housing slidably attached to the main body for covering. Therefore, a separated covering is avoided. Furthermore, by installing a light-directing device on the housing, when the portable storage device is being used, the user can identify the light of the lamp portion from various angles, and the misjudging can be avoided so that the portable storage device will not be taken out when the data accessing is being performed.

The present invention relates to a portable storage device comprising a housing and a main body. The housing has a first opening and a first directing portion. The main body has a storage portion, a connecting portion corresponding to the first opening, and a second directing portion corresponding to the first directing portion. The main body is slidably located inside the housing, and is directed by the first directing portion and the second directing portion so as to be slidable between a first position and a second position. When the main body is situated at the first position, the connecting portion is exposed outside the first opening, and the portable storage device is at a status of being used. When the main body is situated at the second position, the connecting portion is hidden in the housing, and the portable storage device is at a status of being housed.

In the portable storage device of the invention, the housing further has a second opening, and the main body further has a hanging portion corresponding to the second opening. Preferably, the hanging portion is opposite to the connecting portion. When the main body is situated at the first position, the connecting portion is exposed outside the first opening. The portable storage device is at the status of being used and the hanging portion is hidden in the housing. When the main body is situated at the second position, the connecting portion is hidden in the housing. The portable storage device is at the status of being housed and the hanging portion is exposed outside the second opening. This makes it convenient for the user to carry the portable storage device with him or her.

Furthermore, in the portable storage device of the invention, the first directing portion is a directing slot and the second directing portion is a fastening piece. By the direction and fastening of the directing slot and the fastening piece, the main body is moved between the first position and the second position relative to the housing.

In the portable storage device of the invention, the storage portion can be portable disk drive, and the connecting portion can be a universal serial bus (USB) terminal. Furthermore, the main body can have a lamp portion, such as a light emitting diode (LED), for showing the operating status of the portable storage device, and the housing can have a light-directing portion corresponding to the lamp portion. When the storage device is being used, the light-directing portion will direct the light of the lamp portion to various angles so as to make it easy for the users to identify.

These and other objectives of the present invention will no doubt become obvious to those of ordinary skill in the art after having read the following detailed description of the preferred embodiment, which is illustrated in the various figures and drawings.

DETAILED DESCRIPTION OF THE PREFERRED EMBODIMENT

The present invention relates to a portable storage device comprising a housing and a main body. Please refer to FIG. 2 and FIG. 3. The structure of an embodiment of the portable storage device according to the invention is illustrated as follows.

Figure 1:
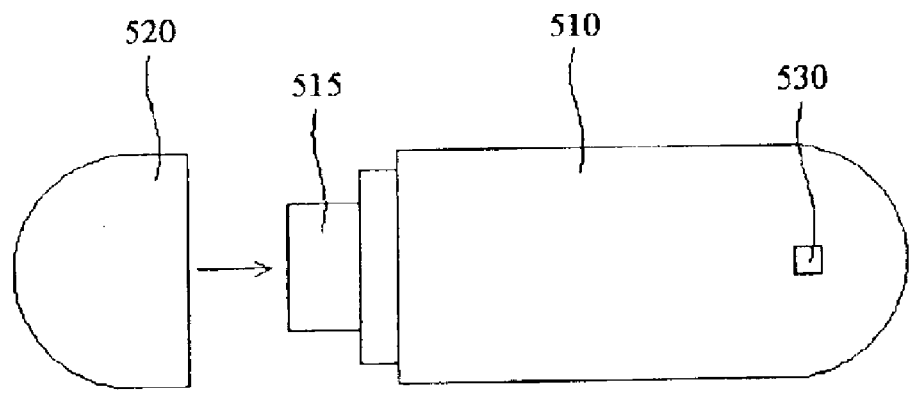
FIG. 1 is a perspective diagram of a conventional USB portable disk drive 500.
Figure 2:
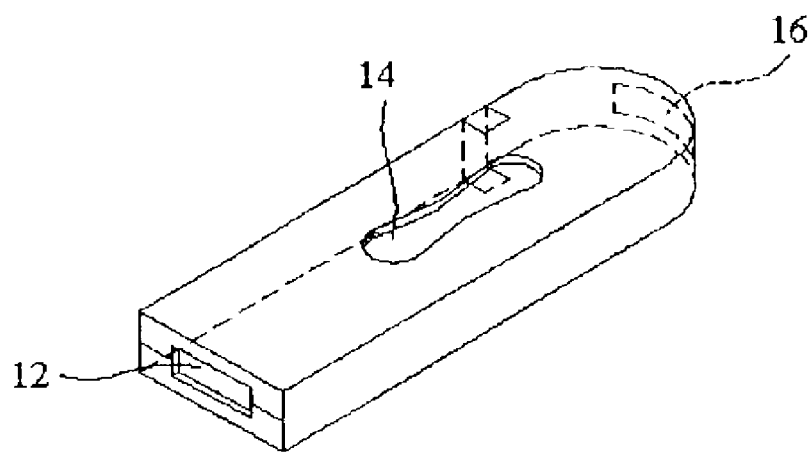
FIG. 2 is a perspective diagram of a housing of a portable storage device according to the present invention.

FIG. 2 is a perspective diagram of a housing 10 according to the invention. In this embodiment, the housing 10 comprises a first opening 12, a first directing portion 14 and a second opening 16. The first opening 12 is located at the front end of the housing 10, and the second opening 16 is located at the back end of the housing 10. The first directing portion 14 is a directing slot of which the widths of the front and back ends are bigger than the width of the middle portion, and is used for the main body 20 to adjust its position. In addition, the housing 10 has a light-directing portion 30. The light-directing portion 30 can be a translucent light-directing slice for directing the light of the lamp portion 16 to various angles.

Figure 3:
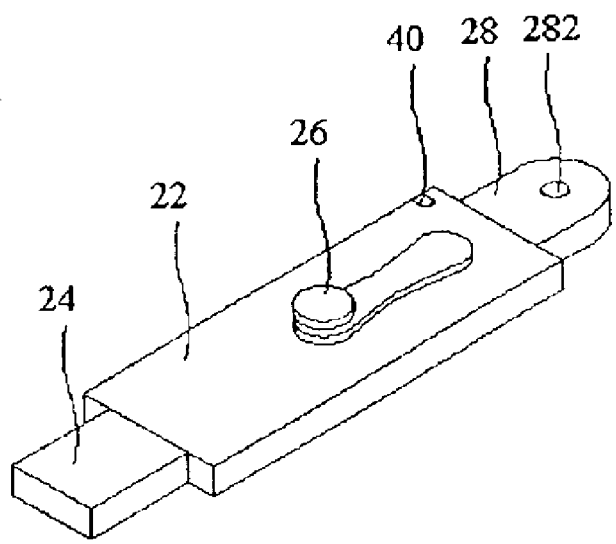
FIG. 3 is a perspective diagram of a main body of a portable storage device according to the present invention.

FIG. 3 is a perspective diagram of a main body 20 according to the invention. The main body 20 has a storage portion 22, a connecting portion 24 corresponding to the first opening 12, a second directing portion 26 corresponding to the first directing portion 14, and a hanging portion 28 corresponding to the second opening 16. The storage portion 22 is a portable disk drive for storing data. The connecting portion 24 is a universal serial bus (USB) terminal. The second directing portion 26 is a pressable fastening piece, and the width of the fastening piece roughly corresponds to the wider portions (the front and back ends) of the directing slot of the first directing portion 14 of the housing 10. Therefore, by means of the directing slot of the first directing portion 14 and the fastening piece of the second directing portion 26, the main body 20 is directed and the position of it is adjusted so that the main body is slidable in the housing 10 and is moved between a first position for being used and a second position for being housed. The hanging portion 28 has a hanging hole 282 for the user to hang the portable storage device on the neck and carry it with him or her. In addition, the main body 20 has a lamp portion 40, such as a light emitting diode (LED), for showing the operating status of the portable storage device.

Figure 4A:
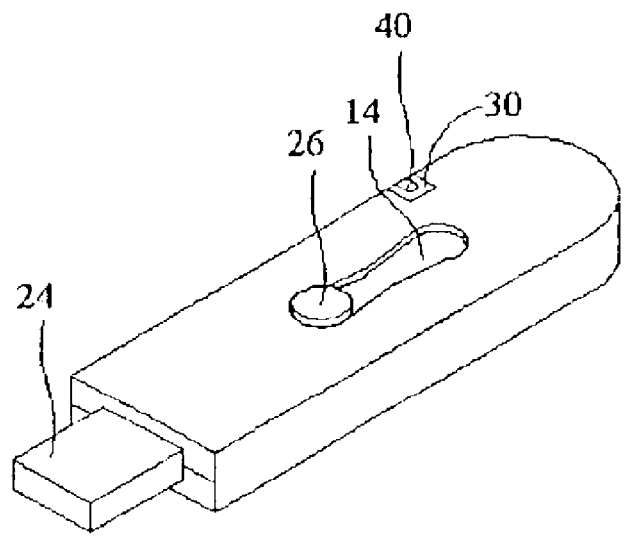
FIG. 4a is a perspective diagram of the portable storage device at the status of being used.
Figure 4B:
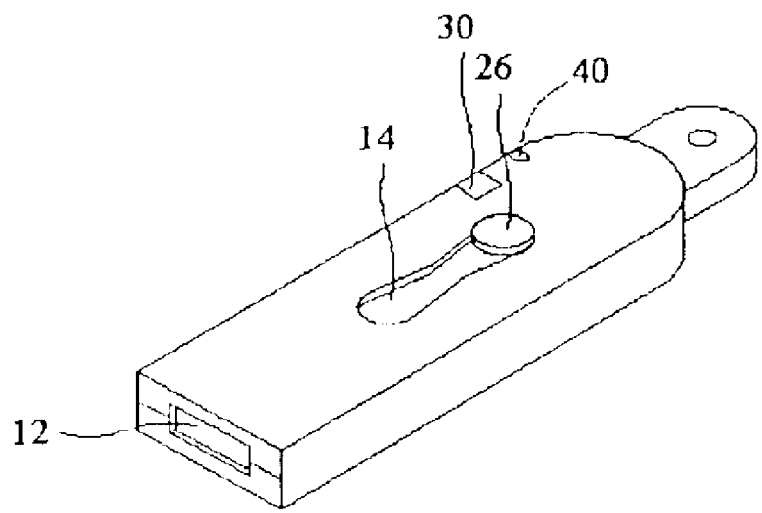
FIG. 4b is a perspective diagram of the portable storage device at the status of being housed.

Please refer to FIGS. 4a and 4b. FIGS. 4a and 4b show the different positions of the main body 20 relative to the housing 10 when the portable storage device is at different statuses.

FIG. 4a shows the main body 20 at the first position for being used. When the main body 20 is situated at the first position for being used, the connecting portion 24 is exposed outside the first opening 12, and the hanging portion 28 is hidden in the housing 10, and the lamp portion 40 corresponds to the light-directing portion 30. The portable storage device is at the status of being used. The connecting portion 24 is exposed and can be plugged into the USB socket of the computer. The lamp portion 40 is turned on and emits light, and the light-directing portion 30 directs the light of the lamp portion 40 to various angles so as to make it easy for the user to identify the light.

FIG. 4b shows the main body 20 at the second position for being housed. When the main body 20 is situated at the second position for being housed, the connecting portion 24 is hidden in the housing 10, and the hanging portion 28 is exposed outside the second opening 16. The portable storage device is at the status of being housed. Because the connecting portion 24 is hidden in the housing 10, the housing functions as a covering for protecting the connecting portion 24 and keeping it from dust. The hanging portion 28 is exposed, and it is convenient for the user to hang the portable storage device on the neck and carry it with him or her. In addition, because the portable storage device is not being used, the lamp portion 40 is turned off and no light is emitted, and therefore, the lamp portion 40 is not directly opposite to the light-directing portion 30.

When the user wants to use the portable storage device of the invention, the user has to press down the fastening piece of the second directing portion 26 so as to make the fastening piece move forward to the front end of the directing slot and be fastened to the front end. Thus, the main body 20 is situated at the first position relative to the housing 10, and the portable storage device is at the status of being used. When the portable storage device finishes the data accessing and the using of the portable storage device is finished, the user has to press down the fastening piece of the second directing portion 26 so as to make the fastening piece move backward to the back end of the directing slot and be fastened to the back end. Thus, the main body 20 is situated at the second position relative to the housing 10, and the portable storage device is at the status of being housed.

It should be noticed that the positions where the lamp portion 40 and the light-directing portion 30 are located can be different depending on the different conditions of the combination of the housing 10 and the main body 20. Thus, the lamp portion 40 is not limited to be located at one side of the main body 20 as mentioned above.

In addition, the first directing portion 14 is not limited to be a directing slot, and the second directing portion 26 is not limited to be a fastening piece. That is, the way of matching and operating the first directing portion 14 and the second directing portion 26 is not limited to that of matching and operating the directing slot and the fastening piece. Other designs can be applied to the first directing portion 14 and the second directing portion 26 as long as it is easy and convenient for the user to operate.

Furthermore, the hanging portion 28 of the invention is not limited to be the hanging hole 282. Other designs, such as a hanging hook or a hanging ring, can be applied to the hanging portion 28.

In the portable storage device of the present invention, the housing 10 slidably attached to the main body 20 takes the place of the conventional covering, and therefore, a separated covering is avoided. Furthermore, by installing the light-directing portion 30 on the housing 10, the light-of the lamp portion 40 can be directed to various angles when the storage device is being used, and the user can easily identify the light of the lamp portion 40 from various angles, and the misjudging can be avoided so that the portable storage device will not be taken out when the data accessing is being performed. Therefore, the present invention can resolve the problems caused by the conventional USB portable disk drive.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A portable storage device comprising:

a housing comprising a first opening and a first directing portion; and a main body comprising a storage portion, a connection portion corresponding to the first opening, and a second directing portion corresponding to the first directing portion;

wherein the main body is slidably located inside the housing, and is slidable between a first position and the second directing portion, and when the main body is situated at the first position, the connecting portion is exposed outside the first opening, and when the main body is situated at the second position, the connection portion is hidden in the housing.

2. The portable storage device of claim 1, wherein the housing further has a second opening, and the main body further has a hanging portion corresponding to the second opening.

3. The portable storage device of claim 2, wherein when the main body is situated at the first position, the hanging portion is hidden in the housing, and when the main body is situated at the second position, the hanging portion is exposed outside the second opening.

4. The portable storage device of claim 1, wherein the first directing portion is a directing slot.

5. The portable storage device of claim 4, wherein the second directing portion is a fastening piece.

6. The portable storage device of claim 1, wherein the connecting portion is a universal serial bus (USB) terminal.

7. The portable storage device of claim 1, wherein the storage portion is a portable disk drive.

8. The portable storage device of claim 1, wherein the main body further has a lamp portion.

9. The portable storage device of claim 8, wherein the housing has a light-directing portion corresponding to the lamp portion.

10. The portable device of claim 8, wherein the lamp portion is a light emitting diode (LED).

* * * * *